US006767620B2

(12) United States Patent
Zambounis et al.

(10) Patent No.: US 6,767,620 B2
(45) Date of Patent: *Jul. 27, 2004

(54) PIGMENTED POROUS MATERIAL

(75) Inventors: John Zambounis, Basel (CH); Patrick Verhoustraeten, Lörrach (DE); Henri Dubas, Oberwil (CH); Zhimin Hao, Marly (CH); Patrice Bujard, Kenneth Square, PA (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/201,014

(22) Filed: Jul. 22, 2002

(65) Prior Publication Data

US 2003/0012943 A1 Jan. 16, 2003

Related U.S. Application Data

(62) Division of application No. 09/096,439, filed on Jun. 11, 1998, now abandoned.

(30) Foreign Application Priority Data

Jun. 17, 1997 (CH) .............................................. 1476/97

(51) Int. Cl.[7] .............................. B32B 5/18; B05D 3/00
(52) U.S. Cl. ................................. 428/304.4; 428/311.1; 428/312.2; 428/312.4; 428/312.6; 428/320.2; 428/321.1; 428/402; 428/447; 428/537.1; 428/537.5; 428/540; 427/553; 427/557; 427/226; 427/384
(58) Field of Search ........................... 428/304.4, 311.1, 428/312.2, 312.4, 312.6, 317.9, 320.2, 321.1, 327, 402, 447, 452, 537.1, 537.5, 540, 541; 8/402; 427/553, 557, 226, 384

(56) References Cited

U.S. PATENT DOCUMENTS

| | | | |
|---|---|---|---|
| 2,225,604 A | 12/1940 | Lubs et al. | 8/85 |
| 2,391,613 A | 12/1945 | Black | 8/6.5 |
| 3,776,752 A | 12/1973 | Craven | 117/10 |
| 3,839,073 A | 10/1974 | Hill | 117/57 |
| 4,090,887 A | 5/1978 | Marquisee et al. | 106/288 |
| 4,826,976 A | 5/1989 | Borror et al. | 544/58.4 |
| 4,855,144 A * | 8/1989 | Leong et al. | 424/487 |
| 5,073,195 A | 12/1991 | Cuthbert et al. | 106/2 |
| 5,243,052 A | 9/1993 | Taylor et al. | 546/154 |
| 5,468,257 A | 11/1995 | Probst et al. | 8/436 |
| 5,585,189 A | 12/1996 | Inoue et al. | 428/461 |
| 5,595,589 A | 1/1997 | Hoshiba et al. | 106/19 |
| 6,284,036 B1 * | 9/2001 | Homma et al. | 106/493 |

FOREIGN PATENT DOCUMENTS

| | | |
|---|---|---|
| EP | 0648770 | 4/1995 |
| EP | 0648817 | 4/1995 |
| EP | 0654711 | 5/1995 |
| EP | 0742556 | 11/1996 |
| JP | 4-124175 | 4/1992 |

OTHER PUBLICATIONS

Derwent Abstr. 95–148665 for EP 648770, (4/95).
Derwent Abstr. 96–499531 for EP 742556, (11/96).
Derwent Abstr. 95–148699 for EP 648817 (4/95).
Derwent Abstr. 90–020141 for JP 1301366 (12/89).
Derwent Abstr. 98–370632 for JP 10147060 (6/98).

* cited by examiner

*Primary Examiner*—Marie Yamnitzky
(74) *Attorney, Agent, or Firm*—Tyler A. Stevenson

(57) ABSTRACT

A coloured porous material comprising in its pores an effectively colouring amount of an organic pigment which is obtainable by fragmenting a meltable or solvent-soluble pigment precursor, and a process for its preparation. The instant coloured porous material powders are used as pigments for high molecular weight organic materials.

15 Claims, No Drawings

PIGMENTED POROUS MATERIAL

This is a divisional of application Ser. No. 09/096,439 filed Jun. 11, 1998 now abandoned.

The present application relates to porous materials given coloured pigmentation with organic pigments localized in their pores and to a process for their preparation.

Porous materials are commonly coloured with dyes that are applied, for example, as stains. In order to achieve satisfactory colouring results with this method a requirement is that the porous material to be coloured has a high and uniform affinity for the dye; this requirement, however, is seldom met. Porous materials coloured with dyes possess, moreover, an undesirably low light stability, and in contact with water or organic liquids (beverages, for example) marks may be formed on articles that are in contact with the materials, since the dyes are in some cases leached out again.

Another method of imparting a coloured appearance to porous materials is to provide them with a pigmented coating. This method, however, has the disadvantage that the pores become sealed by the pigmented coating material, with the result that it becomes difficult if not impossible to perceive visually the nature of the porous material. This is a great disadvantage, especially with natural porous materials, since it is their properties, especially their natural appearance and their permeability, that are the most prized. The properties of the porous material, however, are impaired by a pigmented coating.

EP 648 770 and EP 648 817 disclose carbamate-functional, soluble chromophors which can be converted to the corresponding pigments by heating them to relatively high temperatures, with the ensuing elimination of the carbamate radicals. These compounds are suitable for the mass colouring of polymers and, according to EP 654 711, for the colouring of resists and of polymer coats to which they are applied. Compounds of the same type but with improved properties are known from EP 742 556 and U.S. application Ser. No. 09/013,659.

U.S. Pat. No. 5,243,052 discloses carbonates of quinophthalones, which are of limited solubility and can be used in heat-sensitive recording systems. The leuco dye is embedded within a polymer, preferably in polyethyloxazoline.

Soluble derivatives of triphenylmethane dyes are known from U.S. Pat. No. 4,826,976. They are likewise used in heat-sensitive recording systems, together with a binder such as cellulose acetate-butyrate, polyvinylpyrrolidone or copolymerized ethylene/maleic anhydride.

EP 742 556, furthermore, describes textured pigmentary coatings which are prepared from soluble or meltable precursors and which cover all or part of a substrate surface. The substrates mentioned include fibres and fabrics. It has been found, however, that these pigmentary coatings fail to meet high requirements in terms, in particular, of their rub fastness.

Also known, finally, are numerous heat-sensitive recording systems in which colourless precursors of colorants—as solids, in the form, for example, of aqueous suspensions, together with binders and with or without fillers—are incorporated as the recording layer. For example, JP 04/123,175 describes leucoindigoid derivatives. Colorants in solid form, however, like conventional pigments, for example, make hardly any entry into the pores but for the most part remain, undesirably, on the surface.

It has now surprisingly been found that porous materials can be coloured without impairing their properties, and especially without clogging the pores, if fragmentable pigment precursors in melted or dissolved form are introduced into the pores and then converted to their pigmentary form.

Depending on the solvent, pressure, temperature and treatment time it is possible, surprisingly, to influence the depth of penetration of the pigment precursor and so with great advantage to obtain—in a targeted manner, for example—colorations wherein the pigment is very close to the surface. Since in this case the entirety of the pigment contributes to colouring, it is possible with advantage to reduce its amount to the minimum necessary for coloration, and the colour of the material core remains unaltered.

It is, however, also possible to obtain very high colour saturations (chroma) by using high pigment concentrations. Thus, pigmented porous materials of fine particle size can be used as pigments for colouring high molecular mass organic material. The results are excellent with respect to hue and chroma as well as also to the transparency, when the porous material has a refraction index similar to that of the substrate into which it is incorporated. Very advantageously, these products are less dusting and more easily incorporated into substrates than usual transparent pigments, and rheology problems can be avoided.

Under appropriate conditions it is also possible, however, to provide porous materials with uniform colouring right through, hence allowing them with little or no change in colour to be processed, for example cut, milled, sanded, bent or joined—by gluing, for instance. Consequently, either finished articles or raw material, as desired, can be coloured prior to its processing or shaping.

A particularly advantageous result of this is an increase in production flexibility, and possibilities for making savings, when producing articles from coloured porous materials.

The resulting colorations are surprisingly strong in colour, fast to weathering, light and heat, rubbing, water and solvent, and are also highly uniform optically provided the material itself is uniform in its porosity. With particular advantage this permits the use of materials whose quality would not enable any satisfactory results to be obtained on conventional colouring, a feature which, especially in the case of naturally occurring organic porous materials of complex structure, such as wood, leather or hair, for example, paves the way for ecologically significant, improved utilization of natural resources. A further great advantage is that following the colouring of the porous material its nature is, surprisingly, still apparent to the eye.

The present invention accordingly provides a coloured porous material comprising in its pores an effectively colouring amount of an organic pigment which is obtainable by fragmenting a meltable or solvent-soluble pigment precursor.

Porous materials can be mineral or organic, natural, refined or synthetic. The material may, for example, be chalk, pumice, fired clay, unglazed porcelain, gypsum, concrete, kieselguhr, silica gel, zeolites, wood, paper, leather, imitation leather or hair, in whatever form, or products derived from these. It is preferably a material composed of refined or unrefined organic components of natural origin or, with particular preference, is a refined or unrefined natural organic material. In particular, it can be either hard wood or soft wood.

In another preferred embodiment, however, the material consists of fine particles, most preferably inorganic particles, such as chalk, pumice, fired clay, unglazed porcelain, gypsum, kieselguhr, silica gel or zeolite powders. The particle size is preferably from 0.1 to 10 $\mu$m, most preferably from 1 to 3 $\mu$m. The organic pigment's concentration may be low or high, depending of the desired colour saturation. A low concentration of the organic pigment in the powdered inorganic material leads to pastel tints, while a high concentration of the organic pigment in the powdered inorganic material leads to higher saturations.

Examples of high molecular mass organic materials which can be coloured or pigmented with the instant pigmented porous material powders are cellulose ethers, cellulose esters, such as ethylcellulose, nitrocellulose, cellulose acetate and cellulose butyrate, natural resins or synthetic resins, such as addition polymerization resins or condensation polymerization resins, such as amino resins, especially urea-formaldehyde and melamine-formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or in mixtures.

The abovementioned high molecular mass organic compounds can be present, individually or in mixtures, as plastic masses, as melts or in the form of spinning solutions, varnishes, coating materials or printing inks. Organic high molecular mass materials coloured with the instant pigmented porous material powders possess outstanding colour properties. This invention therefore also provides a composition comprising a high molecular mass organic material and an effective pigmenting amount of an instant pigmented porous material powder.

The instant pigmented porous material powders are preferably employed in an amount of from 0.1 to 50% by weight, most preferably from 1 to 30% by weight, based on the high molecular mass organic material to be pigmented.

The pigmenting of the high molecular mass organic substances with the instant pigmented porous material powders is carried out, for example, by mixing such solid solutions, in the form of masterbatches if desired, into these substrates using roller assemblies, mixers or milling apparatus. The pigmented material is subsequently brought into the desired final form by methods known per se, such as calandering, compression moulding, extrusion, coating, casting or injection moulding. So as to produce non-rigid mouldings, or to reduce their brittleness, it is often desirable to incorporate plasticizers into the high molecular mass compounds prior to their forming. Examples of compounds which can be used as such plasticizers are esters of phosphoric acid, phthalic acid or sebacic acid. The plasticizers can be incorporated into the polymers before or after the incorporation of the instant pigmented porous material powders. In order to achieve different colour effects, it is also possible to add to the high molecular mass organic substances not only the instant pigmented porous material powders but also fillers, reflecting metallic or inorganic particles, for example aluminium flakes or mica, and/or other colour-imparting constituents, such as white, coloured or black pigments, in any desired quantities.

For the pigmentation of varnishes, coating materials and printing inks, the high molecular mass organic materials and the instant pigmented porous material powders, together if desired with additives such as fillers, other pigments, siccatives or plasticizers, are finely dispersed or dissolved in an organic solvent or solvent mixture for them both. In this context it is possible to follow a procedure in which the individual components are dispersed or dissolved individually or else two or more of them are dispersed or dissolved together and only then to combine all of the components.

The instant pigmented porous material powders are particularly suitable for colouring plastics, especially polyvinyl chloride and polyolefins, and for colouring paints, preferably automotive or metallic finishes, for example those containing metal particles or mica particles.

A feature of porous materials is the presence of pores, by which are meant cavities within the physical shell of the material, which may be partly or totally filled with a gas, for example air, or with a liquid, for example water. Preferably, the pores extend at least in part to the surface of the material. The volume of the pores is preferably at least 5% relative to the volume of the geometric shell of the material. With particular preference the volume of the pores is from 20 to 90% relative to the volume of the geometric shell of the material. Preferably, the cross-section of the pores is so fine that by virtue of capillary force an aqueous liquid does not flow out under gravity. With particular preference the average cross-section of the pores is from $1 \cdot 10^{-16}$ to $10^{-6}$ m$^2$, determined at a transverse section through the material, by dividing the total pore area by the number of pores.

Introducing the pigment precursor into the pores of the porous material is effected by applying a solution or melt of the pigment precursor to the porous material using any desired, known method, for example by spraying or impregnation in a bath. The methods of and conditions for treatment of certain materials are known in the technical literature, to which express reference is hereby made. For example, the methods of and conditions for treating wood and wood products with solutions are described in detail in Ullmann's Encyclopaedia of Industrial Chemistry, Vol. A28, 305–393 (5th Edition 1996) and Kirk-Othmer Encyclopaedia of Chemical Technology, Vol. 24, 579–611 (3rd Edition 1978). The application temperature can be an elevated temperature but is judiciously kept low enough for the dissolved or melted pigment precursor not to undergo any, or any significant, decomposition during the minimum time required for the application. If desired, the solution or melt of the pigment precursor may be augmented with further substances known for treating the material, examples being fungicides, antibiotics, flame retardants or moisture repellents.

Suitable solvents are water or, preferably, any desired protic or aprotic solvents, examples being hydrocarbons, alcohols, amides, nitriles, nitro compounds, N-heterocycles, ethers, ketones and esters which may also be either mono- or polyunsaturated or chlorinated: examples are methanol, ethanol, isopropanol, diethyl ether, acetone, methyl ethyl ketone, 1,2-dimethoxyethane, 1,2-diethoxyethane, 2-methoxyethanol, ethyl acetate, tetrahydrofuran, dioxane, acetonitrile, benzonitrile, nitrobenzene, N,N-dimethylformamide, N,N-dimethylacet-amide, dimethyl sulfoxide, N-methylpyrrolidone, pyridine, picoline, quinoline, trichloroethane, benzene, toluene, xylene, anisole and chlorobenzene. Further examples of solvents are described in numerous tabular and reference works. Instead of a single solvent it is also possible to employ mixtures of two or more solvents.

Preference is given to those solvents which do not corrode the substrate that is to be coloured, or do so only very slowly, and which have a boiling point of between 40° C. and 170° C., especially to aromatic hydrocarbons, alcohols, ethers, ketones and esters. Particular preference is given to toluene, methanol, ethanol, isopropanol, 1,2-dimethoxyethane, 1,2-diethoxyethane, 1-methoxy-2-propanol, acetone, methyl ethyl ketone, ethyl acetate, tetrahydrofuran and dioxane, and mixtures thereof.

The concentration of the pigment precursor in water or a solvent is usually from 0.01% by weight, based on the weight of the solution, to approximately 99% by weight of the saturation concentration, it also being possible in certain cases to employ supersaturated solutions without premature precipitation of the solvate. For many pigment precursors the optimum concentration is around ~0.1–50% by weight, often around 1–20% by weight, based on the weight of the solution.

Conversion of the pigment precursor into the pigmentary form takes place by fragmentation under known conditions, for example thermally. in the presence or absence of a catalyst, such as an acid or a cationic photoinitiator which can be introduced into the pores of the porous material before, at the same time as or after the pigment precursor.

Fragmentation can be carried out individually, or simultaneously with any further known, subsequent treatment; for example, in the course of curing an additional transparent coating film.

By an effectively colouring amount is meant that amount which is sufficient to bring about a colour difference $\Delta E^*$ (CIE-L*a*b*) of $\geq 2$ when the coloured material is compared with the uncoloured material under the standard illuminant $D_{65}$ and at a viewing angle of 10°. This amount is preferably from 0.01 to 30% by weight, most preferably from 0.1 to 15% by weight, based on the weight of the coloured material.

Judicious fragmentable pigment precursors are those whose structure includes a complete pigment framework substituted on at least one heteroatom N, O or S. The substituent involved is preferably an oxycarbonyl radical. Where the heteroatom is part of the chromophor or bonded directly to the chromophor, in the course of fragmentation the oxycarbonyl radical is generally eliminated and replaced by a hydrogen atom, so that the structure of the resulting pigment corresponds to that of the unsubstituted pigment framework. Where, on the other hand, the heteroatom is bonded to a substituent of the chromophor, then the fragmentation process is sometimes more complex, and the precise structure of the resulting pigment cannot always be clearly ascertained.

The pigment precursors can be employed individually or else in mixtures with other pigment precursors or with colorants—for example, dyes customary for the corresponding application. Where the pigment precursors are employed in mixtures, the components of the mixture are preferably those whose colour in the pigmentary form is red, yellow, blue, brown or black. From these it is possible to produce brown shades having a particularly natural occurrence. Any dyes added are likewise preferably red, yellow, blue, brown or black.

Preferred pigment precursors are, for example, compounds of the formula (I)

$$A(B)_x \qquad (I),$$

in which x is an integer from 1 to 8,

A is the radical of a chromophor of the quinacridone, anthraquinone, perylene, indigo, quinophthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

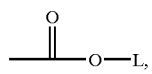

where at least one group B is not hydrogen and, if x is from 2 to 8, the groups B can be identical or different, and L is any suitable solubilizing group, for example tert.-butyl or tert.-amyl. Many other groups suitable for solubilizing pigments are known, for example, from the publications referred to above.

Except in the case of phthalocyanines, A preferably contains at least one directly adjacent or conjugated carbonyl group at each heteroatom attached to x groups B.

A is the radical of known chromophores having the basic structure $$A(H)_x,$$

examples being

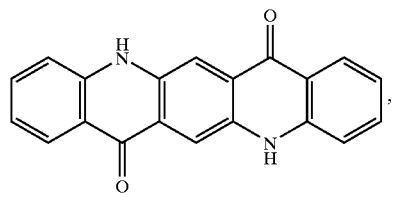

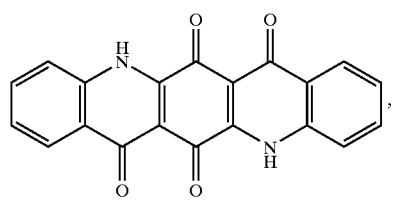

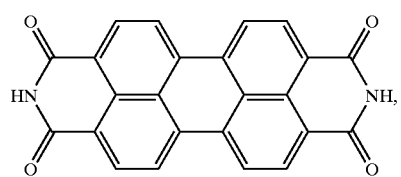

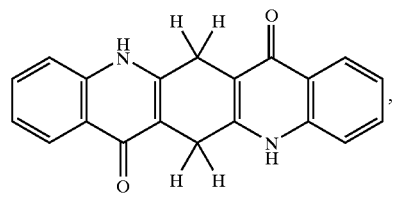

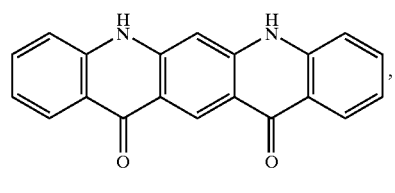

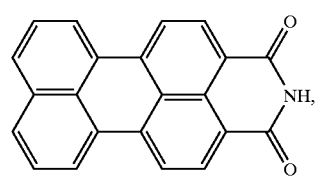

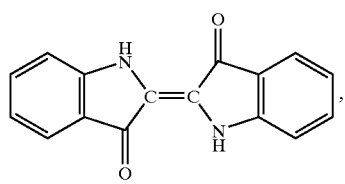
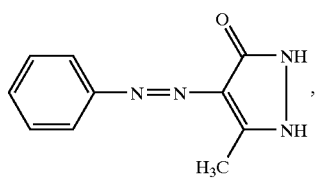
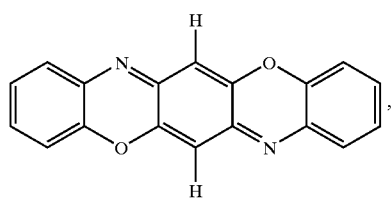
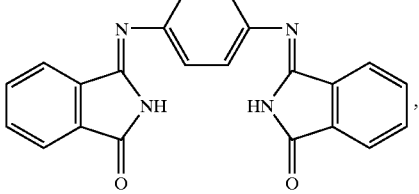
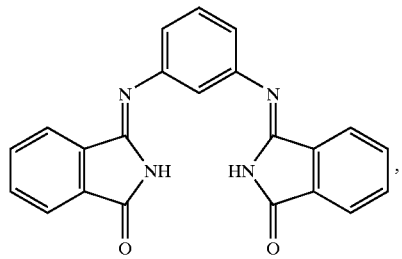
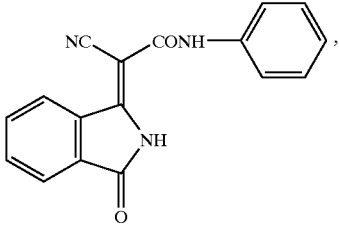
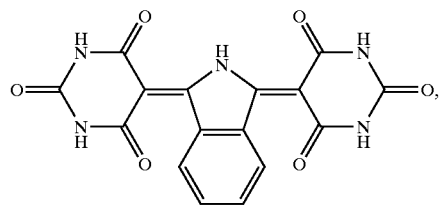
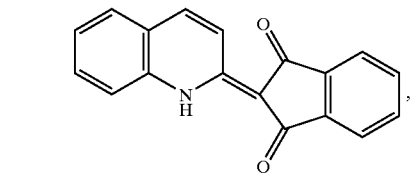
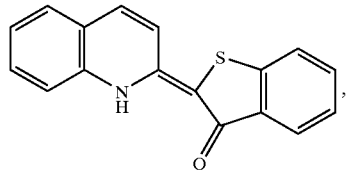
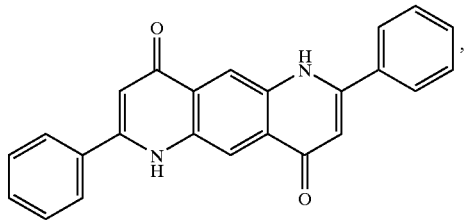
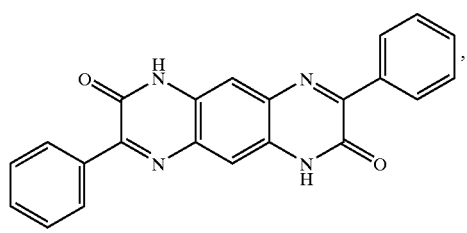
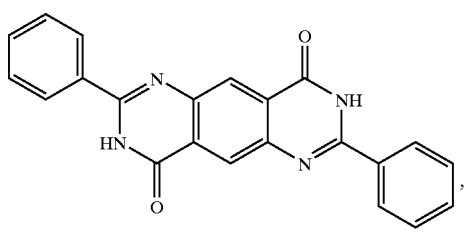
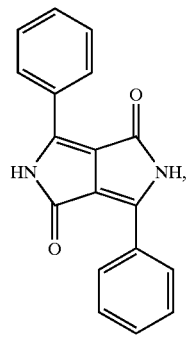
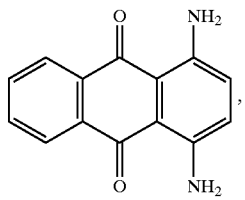

-continued
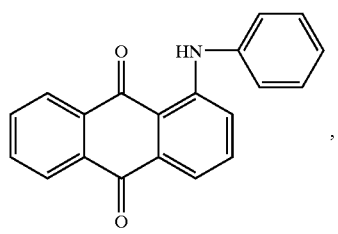
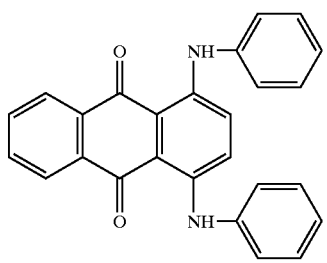
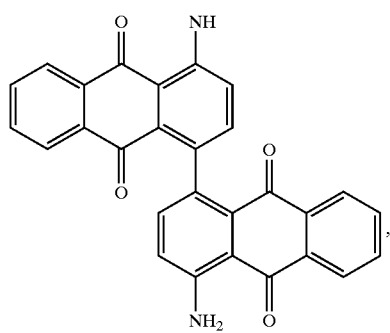
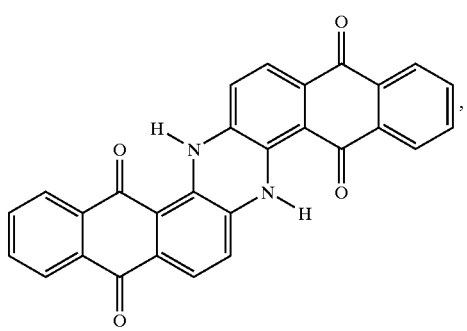
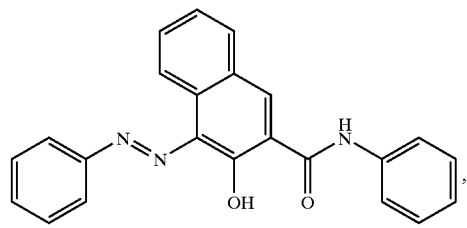
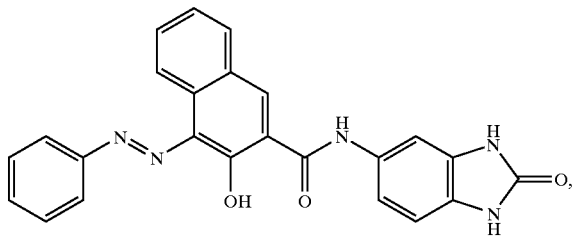
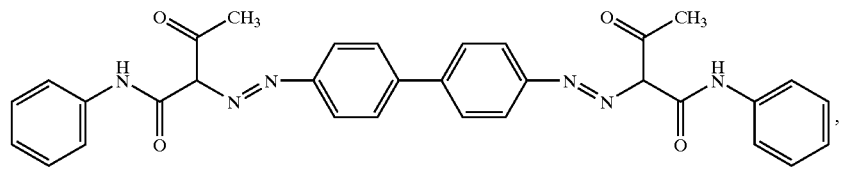
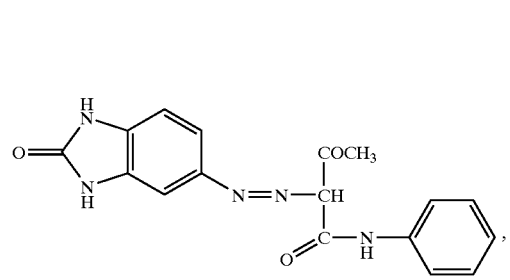
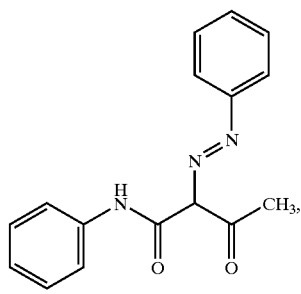
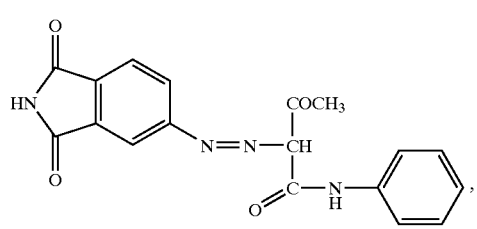
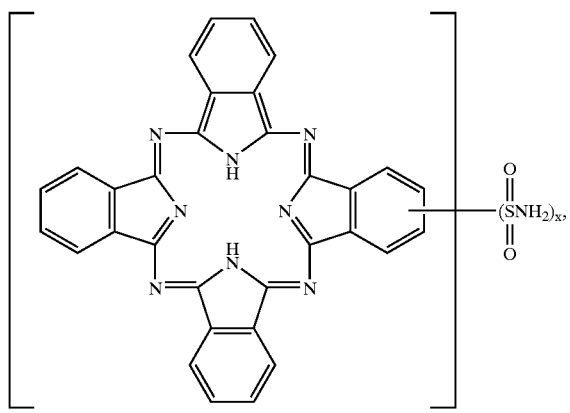

-continued

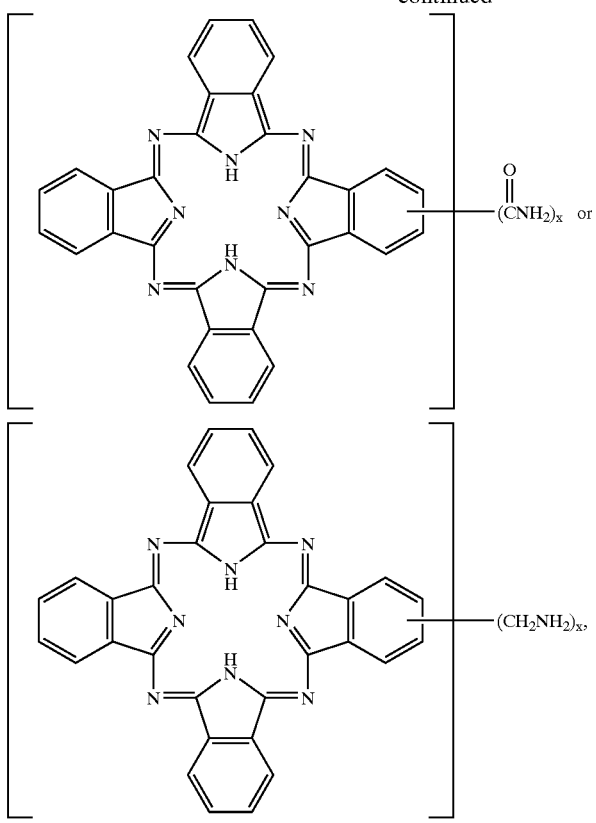

and all known derivatives thereof.
Preferred compounds of the formula I are:
a) perylenecarboximides of the formula

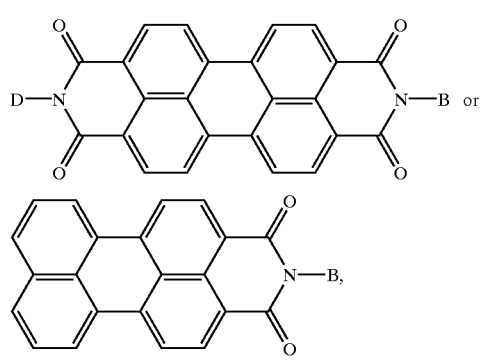

(IIa)

(IIb)

in which D is hydrogen, $C_1$–$C_6$alkyl, unsubstituted or halo- or $C_1$–$C_6$alkyl-substituted phenyl, benzyl or phenethyl or B, b) quinacridones of the formula

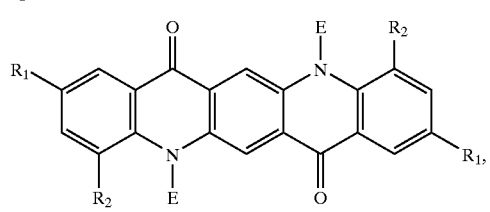

(III)

in which $R_1$ and $R_2$ independently of one another are hydrogen, halogen, $C_1$–$C_{24}$alkyl, $C_1$–$C_6$alkoxy or phenyl, c) dioxazines of the formula

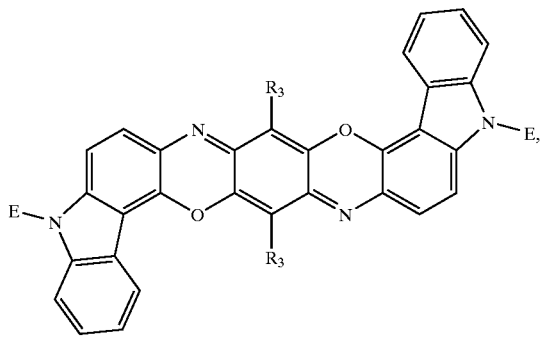

(IV)

in which $R_3$ is hydrogen, halogen or $C_1$–$C_{24}$alkyl, or of the formula

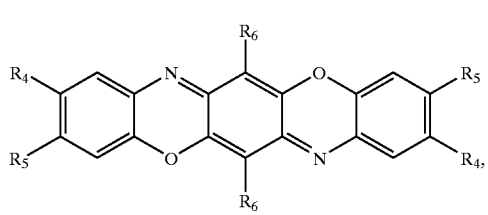

(IVa)

in which $R_4$, $R_5$ and $R_6$ independently of one another are hydrogen, $C_1$–$C_4$alkyl, $C_1$–$C_4$alkoxy, NECOC$_1$-

$C_4$alkyl, NECOphenyl or $N(E)_2$ where at least one of the radicals $R_4$, $R_5$ and $R_6$ is $NECOC_1$-$C_4$alkyl, NECOphenyl or $N(E)_2$, d) isoindolines of the formulae

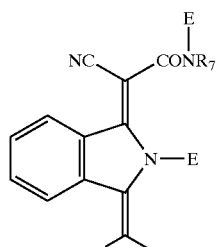
(V)

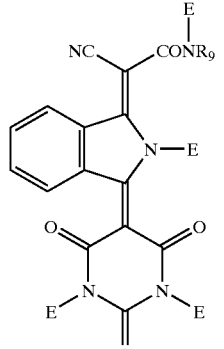
(VI)

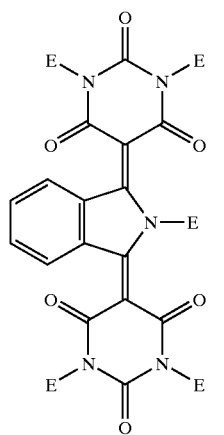
(VII)

in which $R_7$ is a group

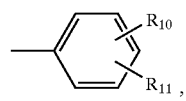

$R_8$ is hydrogen, $C_1$–$C_{24}$alkyl, benzyl or a group

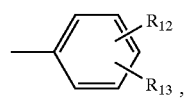

$R_9$ is hydrogen, E or $R_7$, $R_{10}$, $R_{11}$, $R_{12}$ and $R_{13}$ independently of one another are hydrogen, $C_1$–$C_{24}$alkyl, $C_1$–$C_6$alkoxy, halogen or trifluoromethyl, e) isoindolinones of the formula

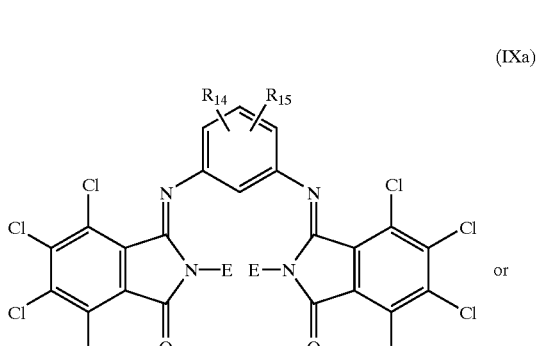
(IXa) or

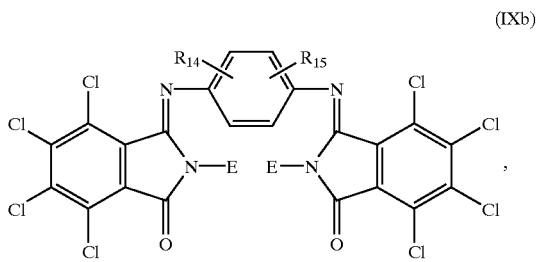
(IXb), in which $R_{14}$ and $R_{15}$ independently of one another are hydrogen, halogen or $C_1$–$C_4$alkyl, f) anthraquinonoid compounds of the formula

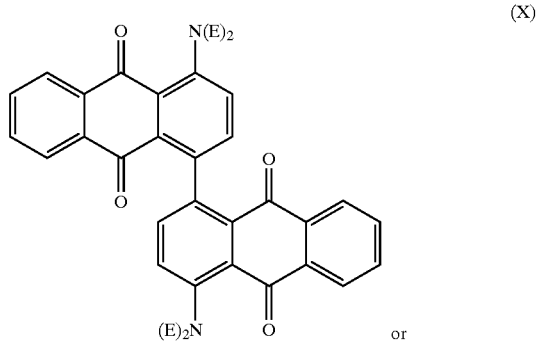
(X) or

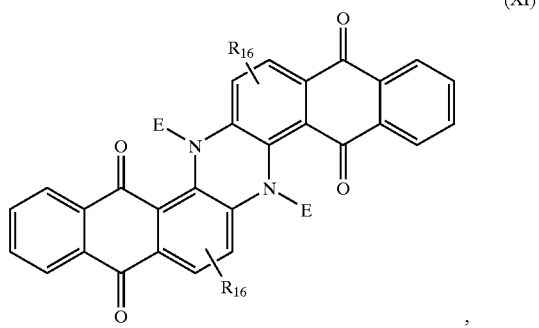
(XI), in which $R_{16}$ is hydrogen or halogen, g) phthalocyanines of the formula

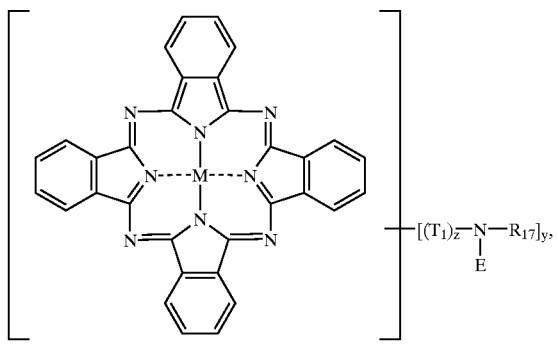

(XII)

in which

M is H$_2$, a divalent metal selected from the group consisting of Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) and Pb(II), preferably Cu(II), Zn(II), Fe(II), Ni(II) or Pd(II), or a divalent oxo metal selected from the group consisting of V(O), Mn(O) and TiO, T$_1$ is —CHR$_{18}$—, —CO— or —SO$_2$—, R$_{17}$ is hydrogen, C$_1$–C$_6$alkyl, —N(E)R$_{18}$, N(E)$_2$, —NECOR$_{19}$, —COR$_{19}$ or

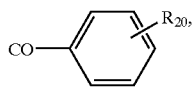

R$_{18}$ is hydrogen or C$_1$–C$_6$alkyl, R$_{19}$ is C$_1$–C$_6$alkyl and

R$_{20}$ is hydrogen, halogen, C$_1$–C$_6$alkyl or C$_1$–C$_6$alkoxy, z is zero or 1 and y is a number from 1 to 8, h) pyrrolo[3,4-c]pyrroles of the formula

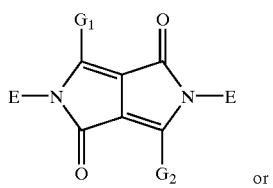

(XIIIa)

or

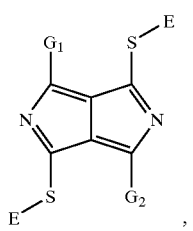

(XIIIb)

in which G$_1$ and G$_2$ independently of one another are a group of the formula

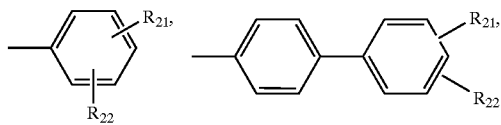

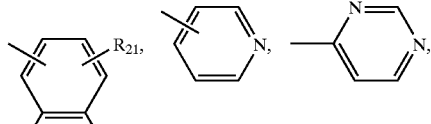

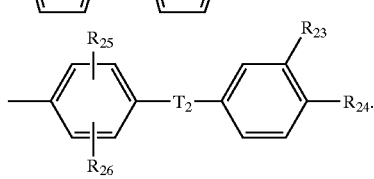

in which

R$_{21}$ and R$_{22}$ independently of one another are hydrogen, halogen, C$_1$–C$_{24}$alkyl, C$_1$–C$_6$alkoxy, C$_1$–C$_{18}$alkylthio, C$_1$–C$_{18}$alkylamino, —CN, —NO$_2$, -phenyl, trifluoromethyl, C$_5$–C$_6$cycloalkyl —C≡N—(C$_1$–C$_{24}$alkyl),

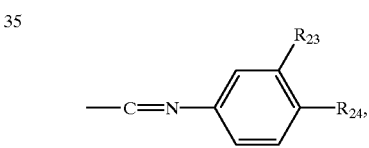

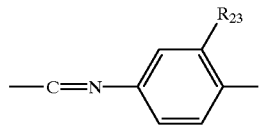

imidazolyl, pyrazolyl, triazolyl, piperazinyl, pyrrolyl, oxazolyl, benzoxazolyl, benzothiazolyl, benzimidazolyl, morpholinyl, piperidinyl or pyrrolidinyl, T$_2$ is —CH$_2$—, —CH(CH$_3$)—, —C(CH$_3$)$_2$—, —CH=N—, —N=N—, —O—, —S—, —SO—, —SO$_2$— or —NR$_{27}$—, R$_{23}$ and R$_{24}$ independently of one another are hydrogen, halogen, C$_1$–C$_6$alkyl, C$_1$–C$_6$alkoxy or —CN, R$_{25}$ and R$_{26}$ independently of one another are hydrogen, halogen or C$_1$–C$_6$alkyl and R$_{27}$ is hydrogen or C$_1$–C$_6$-alkyl, i) quinophthalones of the formula

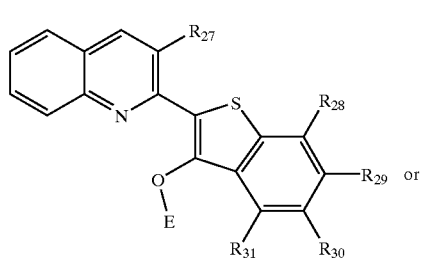

(XIVa)

or

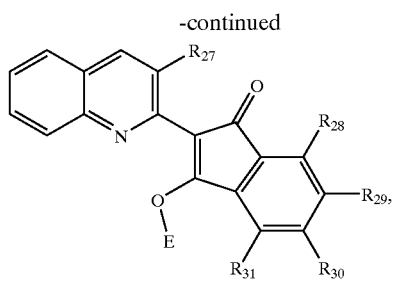
(XIVb)
in which $R_{27}$ is H or O—E,
$R_{28}$ to $R_{31}$ independently of one another are hydrogen, halogen, —COO—$C_1$–$C_6$alkyl or —CONE—$C_1$–$C_6$alkyl,
j) azo compounds of the formula
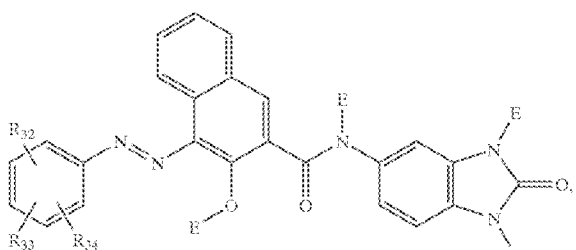
(XVa)
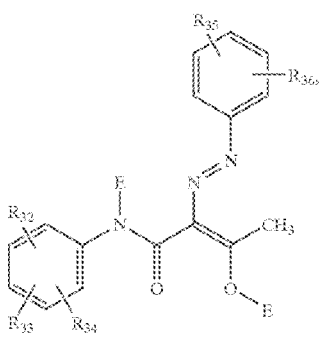
(XVb)
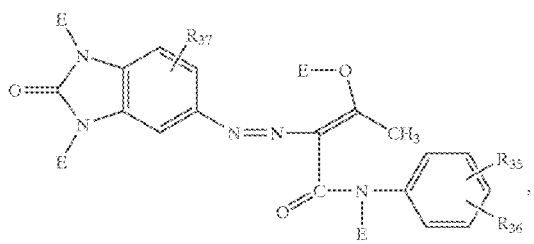
(XVc)
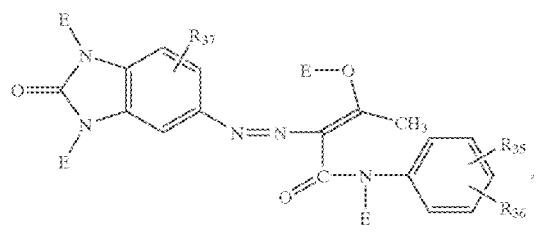
(XVd)
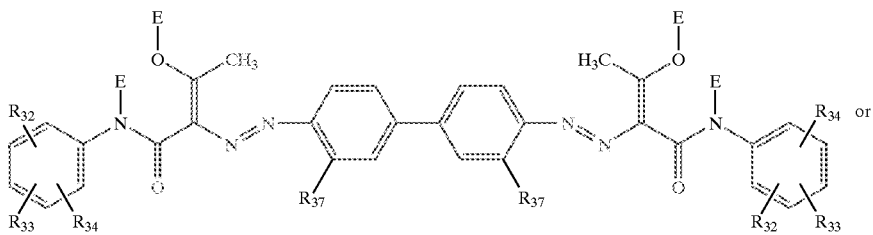
(XVe) or
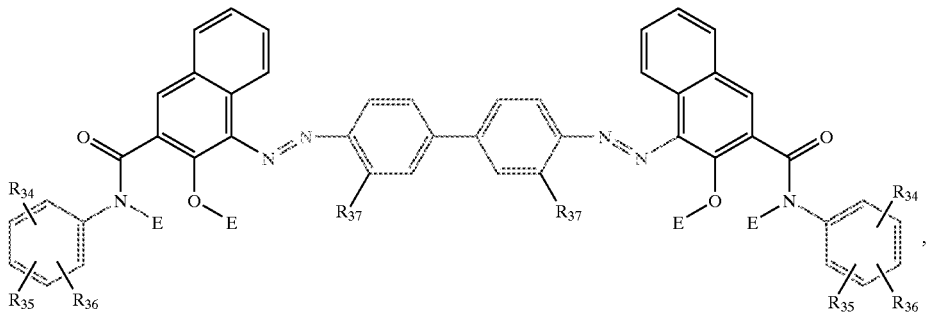
(XVf)

in which $R_{32}$ to $R_{36}$ independently of one another are hydrogen, halogen, $C_1-C_6$alkyl, $C_1-C_6$alkoxy, nitro, acetyl or $SO_2NEC_1-C_6$alkyl, and $R_{37}$ is hydrogen, halogen, $C_1-C_6$alkyl or $C_1-C_6$alkoxy, k) anthraquinones of the formula (XVIa)

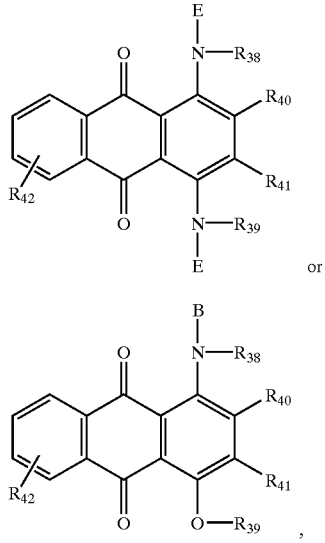

or (XVIb)

in which $R_{38}$ and $R_{39}$ independently of one another are hydrogen, $C_1-C_{12}$alkyl, or $C_6-C_{12}$aryl which is unsubstituted or substituted by halogen, $C_1-C_6$alkyl, $C_1-C_6$alkoxy, nitro, acetyl, $SO_2NEC_1-C_6$alkyl or $SO_2NE_2$, $R_{40}$ and $R_{41}$ independently of one another are hydrogen, halogen, $C_1-C_6$alkyl, $C_1-C_6$alkoxy, nitro, cyano, $CONE_2$, $SO_2NEC_1-C_6$alkyl, $SO_2NE_2$, $SO_3E$, $SO_3Na$ or $C_6-C_{12}$aryl w unsubstituted or substituted by halogen, $C_1-C_6$alkyl, $C_1-C_6$alkoxy, nitro, acetyl, $SO_2NEC_1-C_6$alkyl or $SO_2NE_2$, and $R_{42}$ is hydrogen, halogen, nitro, cyano, hydroxyl or $C_1-C_6$alkoxy, and l) indigo derivatives of the formula (VIII)

in which $R_{43}$ is hydrogen, CN, $C_1-C_6$alkyl, $C_1-C_6$alkoxy or halogen, where in each case in the abovementioned formulae each E independently of the others is hydrogen or B, with the proviso that in each formula E is B on at least one occasion, and B is as defined above.

Preferred quinacridones are those in which in formula III $R_1$ and $R_2$ independently of one another are hydrogen, chlorine or methyl.

Preferred pyrrolo[3,4-c]pyrroles are those in which in formula XIII $G_1$ and $G_2$ are the same and are a group of the formula or where $R_{21}$ and $R_{22}$ independently of one another are hydrogen, chlorine, bromine, $C_1-C_4$alkyl, $C_1-C_6$alkoxy, $C_1-C_6$alkylamino, CN or phenyl, $T_2$ is —O—, —$NR_{27}$—, —N=N— or —$SO_2$—, and $R_{27}$ is hydrogen, methyl or ethyl.

Preferred azo compounds are those in which in the formulae XVa to XVf $R_{32}$ to $R_{36}$ independently of one another are hydrogen, halogen, methyl, methoxy, nitro, acetyl or $SO_2NECH_3$, and $R_{37}$ is halogen or methoxy.

Particularly preferred are quinacridones of the formula (XVII)

(XVIIIa)

(XVIIIb)

in which E is hydrogen or B, with the proviso that in each formula E is B on at least one occasion, and B is as defined above, dioxazines of the formula (IVb)

in which $R_{44}$ and $R_{45}$ independently of one another are $C_1-C_4$alkyl, and E is hydrogen or B, with the proviso that E is B on at least one occasion, and B is as defined above, pyrrolopyrroles of the formula

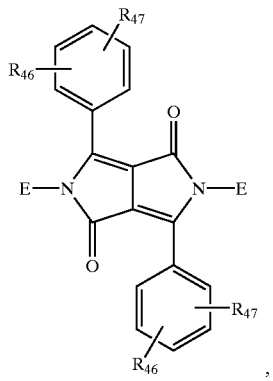

(XIX)

in which $R_{46}$ and $R_{47}$ independently of one another are hydrogen, methyl, tert-butyl, chlorine, bromine, CN or phenyl, and E is hydrogen or B, with the proviso that E is B on at least one occasion, and B is as defined above, phthalocyanines of the formula (XII) in which M is Cu(II) and $R_{16}$ is hydrogen or E, and z is 1 and y is a number from 1 to 4, with the proviso that E is B on at least one occasion, and B is as defined above, isoindolinones of the formula

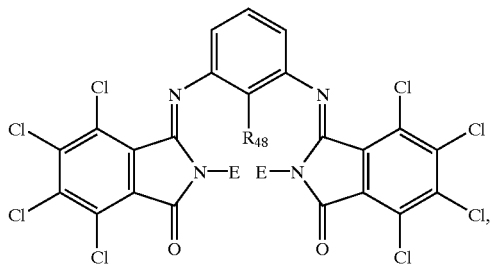

(XX)

in which $R_{48}$ is hydrogen or $C_1$–$C_4$alkyl, and E is hydrogen or B, with the proviso that E is B on at least one occasion, and B is as defined above, indanthrones of the formula

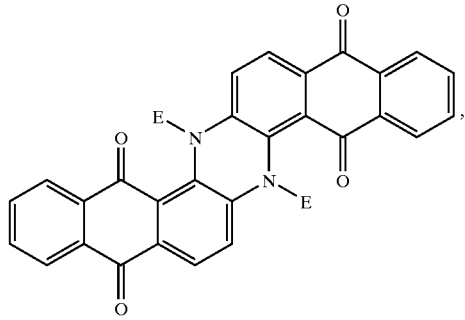

(XXI)

in which E is hydrogen or B, with the proviso that E is B on at least one occasion, and B is as defined above, and azo compounds of the formula XVa, XVb, XVe or XVf, in which $R_{32}$ to $R_{36}$ independently of one another are hydrogen, chlorine, methoxy, nitro, acetyl or $SO_2NECH_3$, and $R_{37}$ is halogen or methoxy, with the proviso that in each formula E is B on at least one occasion, and B is as defined above.

Particularly noteworthy soluble chromophores are those which can be prepared from Colour Index Pigment Yellow 73, Pigment Yellow 74, Pigment Yellow 83, Pigment Yellow 109, Pigment Yellow 139, Pigment Orange 71, Pigment Orange 73, Pigment Red 122, Pigment Red 185, Pigment Red 202, Pigment Red 254, Pigment Red 255, Pigment Red 264, Pigment Blue 25, Pigment Blue 26, Pigment Blue 60, Pigment Blue 64, Pigment Violet 19, Pigment Violet 29 and Pigment Violet 37.

The compounds of the formulae I to XXI are known or can be prepared in analogy to methods known per se, as described, for example, in EP 648 770, EP 648 817 and EP 742 556.

Preferably —L is a group of the formula

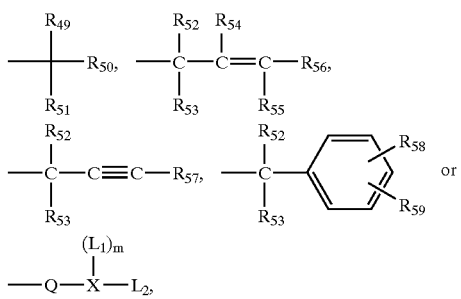

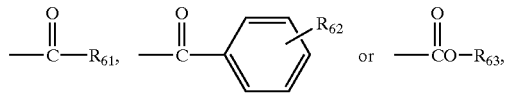

in which $R_{49}$, $R_{50}$ and $R_{51}$ independently of one another are $C_1$–$C_6$alkyl, $R_{52}$ and $R_{53}$ independently of one another are $C_1$–$C_6$alkyl, O, S or $N(R_{60})_2$-interrupted $C_1$–$C_6$alkyl, unsubstituted or $C_1$–$C_6$alkyl-, $C_1$–$C_6$alkoxy-, halo-, cyano- or nitro-substituted phenyl or biphenylyl, $R_{54}$, $R_{55}$ and $R_{56}$ independently of one another are hydrogen or $C_1$–$C_6$alkyl, $R_{57}$ is hydrogen, $C_1$–$C_6$alkyl or a group of the formula $R_{58}$ and $R_{59}$ independently of one another are hydrogen, $C_1$–$C_6$alkyl, $C_1$–$C_6$alkoxy, halogen, cyano, nitro, $N(R_{60})_2$, unsubstituted or halo-, cyano-, nitro-, $C_1$–$C_6$alkyl- or $C_1$–$C_6$alkoxy -substituted phenyl, $R_{60}$ and $R_{61}$ are $C_1$–$C_6$alkyl, $R_{62}$ is hydrogen or $C_1$–$C_6$alkyl and $R_{63}$ is hydrogen, $C_1$–$C_6$alkyl unsubstituted or $C_1$–$C_6$alkyl-substituted phenyl, Q is p,q–$C_2$–$C_6$alkylene which is unsubstituted or substituted one or more times by $C_1$–$C_6$alkoxy, $C_1$–$C_6$alkylthio or $C_2$–$C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly-$C_1$–$C_{12}$alkoxy-, —$C_1$–$C_{12}$alkylthio-, —$C_2$–$C_{24}$dialkylamino-, —$C_6$–$C_{12}$aryloxy-, —$C_6$–$C_{12}$arylthio-, —$C_7$–$C_{24}$alkylarylamino- or —$C_{12}$–$C_{24}$diarylamino-substituted $C_1$–$C_6$alkyl or [—(p',q'—$C_2$–$C_6$alkylene)—Z—]$_n$—$C_1$–$C_6$alkyl, where n is a number from 1 to 1000, p' and q' are different numeric locants, each Z independently of the others is a heteroatom O, S or $C_1$–$C_{12}$alkyl-substituted N, and $C_2$–$C_6$alkylene in the repeating units [—$C_2$–$C_6$alkylene-Z —] can be identical or different, and $L_1$ and $L_2$ can be saturated or mono- to deca-unsaturated, uninterrupted or interrupted in any desired points by from 1 to 10 groups selected from the group consisting of —(C=O)— and —C$_6$H$_4$—, and may carry no or 1 to 10 further substituents selected from the group consisting of halogen, cyano and nitro.

Of particular interest are compounds of the formula (I) in which L is C$_1$–C$_6$alkyl or

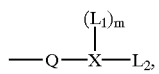

in which Q is C$_2$–C$_4$alkylene and L$_1$ and L$_2$ are [—C$_2$–C$_{12}$alkylene—Z—]$_n$—C$_1$–C$_{12}$alkyl or are C$_1$–C$_{12}$alkyl which is substituted one or more times by C$_1$–C$_{12}$alkoxy, C$_1$–C$_{12}$alkylthio or C$_2$–C$_{24}$dialkylamino, and m and n are as defined above.

Of very particular interest are compounds of the formula (I) in which L is C$_4$–C$_5$alkyl (especially tert.-butyl or tert.-amyl) or

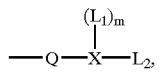

in which Q is C$_2$–C$_4$alkylene, X is O and m is zero, and L$_2$ is [—C$_2$–C$_{12}$alkylene —O—]$_n$—C$_1$–C$_{12}$alkyl or is C$_1$–C$_{12}$alkyl which is substituted one or more times by C$_1$–C$_{12}$alkoxy, especially those in which —O—X— is a group of the formula —C(CH$_3$)$_2$—CH$_2$—O—.

Alkyl or alkylene can be straight-chain, branched, monocyclic or polycyclic.

Thus C$_1$–C$_{12}$alkyl is, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

If C$_2$–C$_{12}$alkyl is mono- or polyunsaturated it is C$_2$–C$_{12}$alkenyl, C$_2$–C$_{12}$alkynyl, C$_2$–C$_{12}$alkapolyenyl or C$_2$–C$_{12}$alkapolyynyl in which two or more double bonds may if appropriate be isolated or conjugated, examples being vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl or the various isomers of hexenyl, octenyl, nonenyl, decenyl or dodecenyl.

C$_2$–C$_4$alkylene is, for example, 1,2-ethylene, 1,2-propylene, 1,3-propylene, 1,2-butylene, 1,3-butylene, 2,3-butylene, 1,4-butylene or 2-methyl-1,2-propylene. C$_5$–C$_{12}$alkylene is, for example, an isomer of pentylene, hexylene, octylene, decylene or dodecylene.

C$_1$–C$_{12}$alkoxy is O—C$_1$–C$_{12}$alkyl, preferably O—C$_1$–C$_4$alkyl.

C$_6$–C$_{12}$aryloxy is O—C$_6$–C$_{12}$aryl, for example phenoxy or naphthoxy, preferably phenoxy.

C$_1$–C$_{12}$alkylthio is S—C$_1$–C$_{12}$alkyl, preferably S—C$_1$–C$_4$alkyl.

C$_6$–C$_{12}$arylthio is S—C$_6$–C$_{12}$aryl, for example phenylthio or naphthylthio, preferably phenylthio.

C$_2$–C$_{24}$dialkylamino is N(alkyl$_1$)(alkyl$_2$), where the sum of the carbon atoms in the two groups alkyl$_1$ and alkyl$_2$ is from 2 to 24, preferably N(C$_1$–C$_4$alkyl)–C$_1$–C$_4$alkyl.

C$_7$–C$_{24}$alkylarylamino is N(alkyl$_1$)(aryl$_2$), where the sum of the carbon atoms in the two groups alkyl$_1$ and aryl$_2$ is from 7 to 24, for example methylphenylamino, ethyinaphthylamino or butylphenanthrylamino, preferably methylphenylamino or ethylphenylamino.

C$_{12}$–C$_{24}$diarylamino is N(aryl$_1$)(aryl$_2$), where the sum of the carbon atoms in the two groups aryl$_1$ and aryl$_2$ is from 12 to 24, for example diphenylamino or phenylnaphthylamino, preferably diphenylamino.

Halogen is chlorine, bromine, fluorine or iodine, preferably fluorine or chlorine.

n is preferably a number from 1 to 100, with particular preference a number from 2 to 12.

In addition to the pigment, the porous material may also contain other compounds in its pores, for example binders or surfactants known in the art to improve the pigment's dispersibility. It has however surprisingly been found, that improved results are obtained when the porous material is treated with a silane or siloxane compound, particularly when the porous material is inorganic, for example silica gel. The amount of silane or siloxane compound is preferably from 1 to 100% by weight, most preferably from 5 to 20% by weight, based on the weight of the organic pigment.

The silane or siloxane compound is preferably of structure

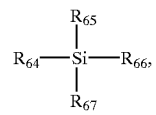

wherein R$_{64}$ to R$_{67}$ are independently OH,

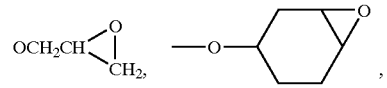

or phenyl or OC$_1$–C$_{16}$alkyl which are unsubstituted or substituted by OH, OC$_1$–C$_{16}$alkyl,

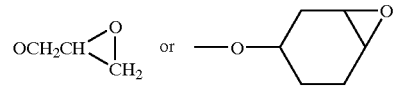

Most preferred silane or siloxane compounds are diphenylsilanediol, diphenylmethoxysilane, glycidoxypropyltrimethoxysilane and 2-(3,4-epoxycyclohexyl)ethyltrimethoxysilane.

The invention also provides a process for preparing a coloured porous material of the invention whose pores comprise an effectively colouring amount of an organic pigment, comprising (a) the treatment of the porous material with a solution or melt of a pigment precursor such that at least part of the pigment precursor enters the pores of the material, and (b) the fragmentation of the pigment precursor that has entered the pores of the material in accordance with treatment (a), to form a pigment, by means of heating or irradiation.

Heating or irradiation step be carried out by any desired means; for example, by treatment in a thermal oven or by electromagnetic radiation, for example visible light, UV or IR radiation, or microwaves, in the presence or absence of a catalyst. The conditions required for fragmentation are known per se for each class of pigment precursors.

Of course, it is judicial to choose pigment precursors the fragmentation temperature of which is lower than the decomposition point of the porous material to be pigmented, so that fragmentation can be accomplished without altering the material's properties. Thus, step (b) is usually accomplished by heating to a temperature of from 100 to 250° C., preferably from 150 to 200° C., particularly preferably from 160 to 200° C., or by irradiating with an amount of energy sufficient for said pigment precursor to be heated to said temperature. It is known that the fragmentation temperature may be lowered by using a catalyst, for example an acid.

The heating time is not critical, as long as care is taken that it is sufficiently long for the fragmentation to be completed. Typically, it ranges from several seconds to several hours, preferably from about 1 to about 30 minutes. The required heating time can be decreased by elevating the temperature.

In addition to the steps (a) and (b), the process may of course comprise additional steps which are known per se, for example a prior bleaching and/or a subsequent overcoating with, for example, a colourless nitrocellulose lacquer.

When the porous material also contains other compounds in its pores, it is preferred to add the latter at the latest before step (b), most preferred before step (a).

The examples which follow illustrate the invention:

EXAMPLE 1

A 100×252×1 mm piece of obeche wood stored at 40% residual moisture content is treated with a solution of 3 g of pigment precursor of the formula

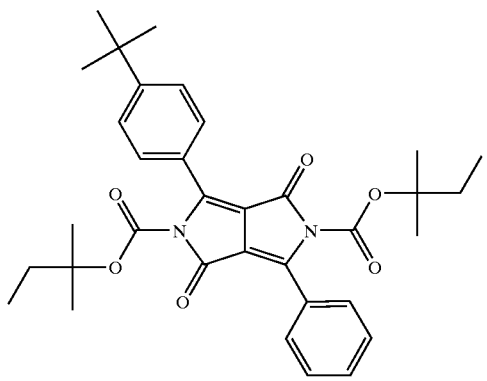

in 100 ml of ethyl acetate for 18 hours at 25° C.

It is then left to dry in the air for 24 hours, and is subsequently heated at 200° C. for 10 minutes.

A wooden sheet coloured red with good fastness properties is obtained whose structure corresponds completely, both optically and to the touch, to that of natural wood.

EXAMPLE 2

A 100×252×1 mm piece of ash wood stored at 40% residual moisture content is treated with a solution of 3 g of pigment precursor of the formula

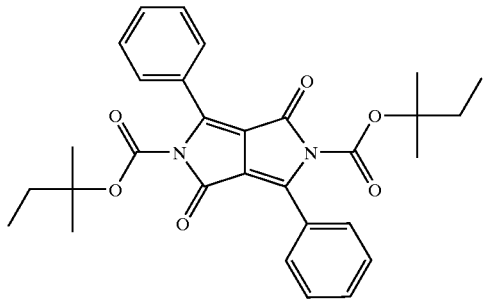

in 100 ml of 1-methoxy-2-propanol for 18 hours at 25° C.

It is then left to dry in the air for 24 hours, and is subsequently heated at 160° C. for 30 minutes.

A wooden sheet coloured red with good fastness properties is obtained whose structure corresponds completely, both optically and to the touch, to that of natural wood.

EXAMPLE 3

63 g of the pigment precursor of the formula

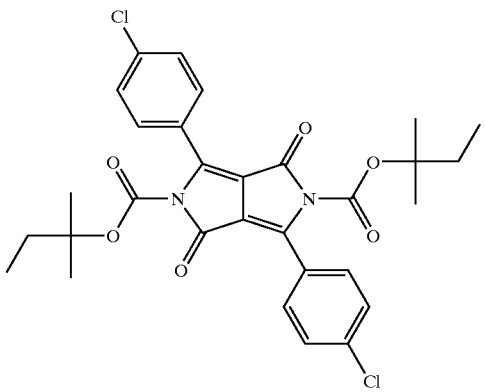

are dissolved in 881 g of tetrahydrofuran. 75 g of porous silica powder having a particle size of 1.4 μm, a porosity of 21 nm, a pore volume of 1.6 ml/g and a BET surface of 300 m$^2$/g (silica grade 310P/Fuji Silysia) are then added to the solution and the whole is stirred at room temperature for 24 hours. The slurry is then filtrated; the residue is dried at 40° C./100 mbar and then heated at 180° C. to regenerate the pigment. A red powder containing 10.6% by weight of C.I. Pigment Red 254 is obtained.

EXAMPLE 4

The procedure of Example 3 is used, with the difference that 4.4 g of glycidoxy-propyltrimethoxysilane is added to the solution before the silica powder. A red powder containing 12.5% by weight of C.I. Pigment Red 254 is obtained.

EXAMPLE 5

The procedure of Example 3 is used, with the difference that porous silica powder having a particle size of <2.7 μm, a porosity of 24 nm, a pore volume of 1.8 ml/g and a BET surface of 300 m$^2$/g (silica grade 250/Fuji Silysia) is used. A red powder containing 16.7% by weight of C.I. Pigment Red 254 is obtained.

EXAMPLE 6

The procedure of Example 5 is used, with the difference that 4.4 g of diphenylsilanediol are added to the solution before the silica powder. A red powder containing 4.73% by weight of C.I. Pigment Red 254 is obtained.

EXAMPLE 7

The procedure of Example 6 is used, with the difference that 2-(3,4-epoxy-cyclohexyl)ethyltrimethoxysilane is used instead of diphenylsilanediol. A red powder containing 4.54% by weight of C.I. Pigment Red 254 is obtained.

EXAMPLE 8

The procedure of Example 6 is used, with the difference that diphenylmethoxy-silane is used instead of diphenylsilandiol. A red powder containing 5.04% by weight of C.I. Pigment Red 254 is obtained.

EXAMPLE 9

The procedure of Example 8 is used, with the difference that porous silica powder having a particle size of 1.8 μm, a porosity of 7 nm, a pore volume of 0.8 ml/g and a BET surface of 500 m²/g (silica grade 530/Fuji Silysia) is used. A red powder containing 3.12% by weight of C.I. Pigment Red 254 is obtained.

EXAMPLE 10

The procedure of Example 7 is used, with the difference that the porous silica powder of Example 9 is used. A red powder containing 2.03% by weight of C.I. Pigment Red 254 is obtained.

EXAMPLE 11

The procedure of Example 6 is used, with the difference that the porous silica powder of Example 9 is used. A red powder containing 1.54% by weight of C.I. Pigment Red 254 is obtained.

EXAMPLE 12

The procedure of Example 11 is used, with the difference that porous silica powder having a particle size of 2.5 μm, a porosity of 17 nm, a pore volume of 1.25 ml/g and a BET surface of 300 m²/g (silica grade 430/Fuji Silysia) is used.

EXAMPLE 13

17 g of the product from Example 3 are mixed with 67 g of polyvinyl chloride, 33 g of dioctyl phthalate, 2 g of dibutyltin dilaurate and 2 g of titanium dioxide and processed on a roller bed at 160° C. for 15 minutes to form a thin film. The red PVC film thus produced has a high chroma and a high transparency.

EXAMPLE 14

7.5 g of the product of Example 3, 98.9g of CAB solution consisting of
- 41.0 g of cellulose acetobutyrate ®CAB 531.1, 20% in butanol/xylene 2:1 (Eastman Chem.),
- 1.5 g of zirconium octoate,
- 18.5 g of ®SOLVESSO 150 (ESSO),
- 21.5 g of butyl acetate and
- 17.5 g of xylene, 36.5 g of polyester resin ®DYNAPOL H700 (Dynamit Nobel), 4.6 g of melamine resin MAPRENAL MF650 (Hoechst) and 2.5 g of dispersant ®DISPERBYK160 (Byk Chemie) are dispersed together in a shaker machine for 90 minutes (total coating material 150 g; 5% pigment).

27.69 g of the resulting masstone paint are mixed, for the base coat, with 17.31 g of aluminium stock solution (8%) consisting of
- 12.65 g of ®SILBERLINE SS 3334AR, 60% (Silberline Ltd.)
- 56.33 g of CAB solution (composition as above),
- 20.81 g of polyester resin ®DYNAPOL H700,
- 2.60 g of melamine resin ®MAPRENAL MF650 and
- 7.59 g of ®SOLVESSO 150, and the mixture is applied by spraying to an aluminum panel (wet film about 20 μm). After an evaporation time of 30 minutes at room temperature, a thermosetting acrylic varnish consisting of
- 29.60 g of acrylic resin ®URACRON 2263 XB, 50% in xylene/butanol (Chem. Fabrik Schweizerhalle),
- 2.75 g of butylglycol acetate,
- 5.80 g of mielamine resin ®CYMEL 327, 90% in isobutanol,
- 5.70 g of xylene,
- 1.65 g of n-butanol,
- 0.50 g of silicone fluid, 1% in xylene,
- 3.00 g of light stabilizer ®TINUVIN 900, 10% in xylene (Ciba) and
- 1.00 g of light stabilizer ®TINUVIN 292,10% in xylene (Ciba), is applied by spraying as topcoat (wet film about 50 μm). After a further 30 minutes of evaporation at room temperature, the coating is baked at 130° C. for 30 minutes.

What is claimed is:

1. A porous material comprising in its pores a meltable or solvent-soluble pigment precursor, wherein the pigment precursor is a compound of the formula (I)

$$A(B)_x \qquad (I),$$

in which x is an integer from 1 to 8,

A is the radical of a chromophore of the quinacridone, anthraquinone, perylene, indigo, quino-phthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

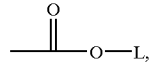

where at least one group B is not hydrogen and, if x is from 2 to 8, the groups B can be identical or different, and L is any suitable solubilizing group.

2. A porous material according to claim 1, wherein the material is chalk, pumice, fired clay, unglazed porcelain, gypsum, concrete, kieselguhr, silica gel, zeolites, wood, paper, leather or imitation leather.

3. A porous material according to claim 1, wherein the material consists of particles.

4. A porous material according to claim 3, wherein the particle size is 0.1 to 10 μm.

5. A porous material according to claim 1, wherein the amount of pigment precursor in the pores of the porous material provides from 0.01 to 30% by weight organic pigment based on the total weight of coloured porous material upon conversion of the pigment precursor to organic pigment.

6. A porous material according to claim 1, in which —L is a group of the formula

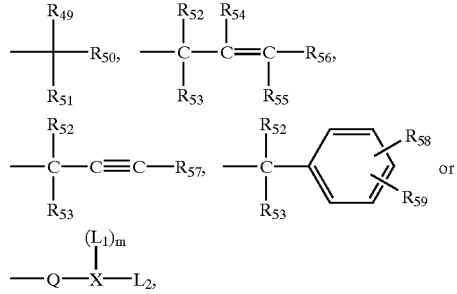

in which $R_{49}$, $R_{50}$ and $R_{51}$ independently of one another are $C_1$–$C_6$alkyl, $R_{52}$ and $R_{53}$ independently of one another are $C_1$–$C_6$alkyl, O, S or $N(R_{60})_2$-interrupted $C_1$–$C_6$alkyl, unsubstituted or $C_1$–$C_6$alkyl-, $C_1$–$C_6$alkoxy-, halo-, cyano- or nitro-substituted phenyl or biphenylyl, $R_{54}$, $R_{55}$ and $R_{56}$ independently of one another are hydrogen or $C_1$–$C_6$alkyl, $R_{57}$ is hydrogen, $C_1$–$C_6$alkyl or a group of the formula

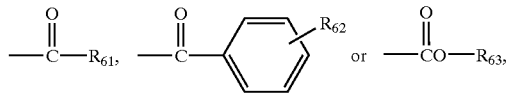

$R_{58}$ and $R_{59}$ independently of one another are hydrogen, $C_1$–$C_6$alkyl, $C_1$–$C_6$alkoxy, halogen, cyano, nitro, $N(R_{60})_2$, unsubstituted or halo-, cyano-, nitro-, $C_1$–$C_6$alkyl- or $C_1$–$C_6$alkoxy-substituted phenyl, $R_{60}$ and $R_{61}$ are $C_1$–$C_6$alkyl, $R_{62}$ is hydrogen or $C_1$–$C_6$alkyl and $R_{63}$ is hydrogen, $C_1$–$C_6$alkyl, unsubstituted or $C_1$–$C_6$alkyl-substituted phenyl, Q is p,q–$C_2$–$C_6$alkylene which is unsubstituted or substituted one or more times by $C_1$–$C_6$alkoxy, $C_1$–$C_6$alkylthio or $C_2$–$C_{12}$dialkylamino, p and q being different numeric locants, X is a heteroatom selected from the group consisting of N, O and S, where m is 0 if X is O or S and is 1 if X is N, and $L_1$ and $L_2$ independently of one another are unsubstituted or mono- or poly—$C_1$–$C_{12}$alkoxy-, —$C_1$–$C_{12}$alkylthio-, —$C_2$–$C_{24}$dialkylamino-, —$C_6$–$C_{12}$aryloxy-, —$C_6$–$C_{12}$arylthio-, —$C_7$–$C_{24}$alkylarylamino- or —$C_{12}$–$C_{24}$diarylamino-substituted $C_1$–$C_6$alkyl or

[—(p',q'–$C_2$–$C_6$alkylene)—Z—]$_n$—$C_1$–$C_6$alkyl, where n is a number from 1 to 1000, p' and q' are different numeric locants, each Z independently of the others is a heteroatom O, S or $C_1$–$C_{12}$alkyl-substituted N, and $C_2$–$C_6$alkylene in the repeating units [—$C_2$–$C_6$alkylene-Z—] can be identical or different and $L_1$ and $L_2$ can be saturated or mono- to deca-unsaturated, uninterrupted or interrupted in any desired points by from 1 to 10 groups selected from the group consisting of —(C=O)— and —$C_6H_4$—, and may carry no or 1 to 10 further substituents selected from the group consisting of halogen, cyano and nitro.

7. A porous material according to claim 1, which additionally contains a binder or a surfactant.

8. A porous material according to claim 1, which has been treated with a silane or siloxane compound.

9. A porous material according to claim 8, wherein the amount of silane or siloxane compound is from 1 to 100% by weight based on the weight of the organic pigment.

10. A porous material according to claim 8, wherein the silane or siloxane compound is of structure

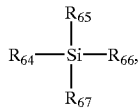

wherein $R_{64}$ to $R_{67}$ are independently OH,

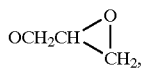

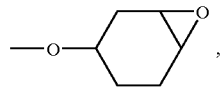

or phenyl or $OC_1$–$C_{16}$alkyl which are unsubstituted or substituted by OH, $OC_1$–$C_{16}$alkyl,

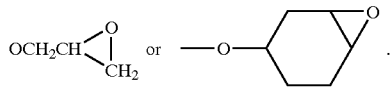

11. A porous material according to claim 8, wherein the silane or siloxane compound is diphenylsilanediol, diphenylmethoxysilane, glycidoxypropyltrimethoxysilane or 2-(3,4-epoxycyclohexyl)ethyltrimethoxysilane.

12. A process for preparing a coloured porous material comprising (a) the treatment of the porous material with a solution or melt of a pigment precursor such that at least part of the pigment precursor enters the pores of the material, wherein the pigment precursor is a compound of the formula (I)

$$A(B)_x \qquad (I),$$

in which x is an integer from 1 to 8,

A is the radical of a chromophore of the quinacridone, anthraquinone, perylene, indigo, quino-phthalone, indanthrone, isoindolinone, isoindoline, dioxazine, azo, phthalocyanine or diketopyrrolopyrrole series which is attached to x groups B via one or more heteroatoms selected from the group consisting of N, O and S and forming part of the radical A, B is hydrogen or a group of the formula

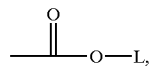

where at least one group B is not hydrogen and, if x is from 2 to 8, the groups B can be identical or different, and L is any suitable solubilizing group, and (b) the fragmentation of the pigment precursor that has entered the pores of the material in accordance with treatment (a), to form a pigment, by means of heating or irradiation.

13. A process according to claim 12, comprising the additional step of treating the porous material with a silane or siloxane compound at the latest before step (b), preferably before step (a).

14. A process according to claim 12, wherein step (b) is accomplished by heating to a temperature of from 100 to 250° C. or by irradiating with an amount of energy sufficient for the pigment precursor to be heated to said temperature.

15. A process according to claim 14, wherein step (b) is accomplished by heating to a temperature of from 150 to 200° C. or by irradiating with an amount of energy sufficient for the pigment precursor to be heated to said temperature.

* * * * *